Patented Jan. 14, 1941

2,228,487

UNITED STATES PATENT OFFICE 2,228,487

ANTISKINNING AND WEATHER RESISTING AGENT FOR DRYING OIL COMPOSITIONS

Harold C. Reynolds, Jr., Elizabeth, and Henry B. Kellog, Union City, N. J., assignors to Standard Oil Development Company, a corporation of Delaware No Drawing. Application October 22, 1938,
Serial No. 236,580

15 Claims. (Cl. 134—26)

The present invention relates to antiskinning and antioxidizing agents in drying oils, paint and varnish compositions. More particularly, the invention relates to drying oil compositions and, includes as its object, the addition thereto of aliphatic, aromatic and aralkyl oximes which possess the characteristic property of retarding the premature oxidation of drying oils, paints, varnishes, enamels and the like. Furthermore, these organic oximes possess the additional characteristic property of interrupting the continued oxidation of drying oils, paints, enamels, varnishes and the like after said products have reached the desired oxidized condition, thereby increasing their durability.

In the manufacture of paints and varnishes, including the incorporation of drying oils therein, it is customary to employ a suitable quantity of an oxidation catalyst to speed up the normal drying rate of the oil so that the composition will dry hard within a reasonable time after it is spread on a surface in a thin film. This positive oxidation catalyst is commonly called a dryer. It is well known that dryers commonly employed induce various oxidation phenomena, some of which are necessary and desirable, and some of which are very objectionable.

The development of the quick drying coating compositions has been attended with difficulties connected with the tendency of these coating compositions to change consistency on storage and to gel and skin on standing in the closed container or when the container cover is removed and the container exposed to the air. When these quick drying varnishes, paints or enamels are applied over surfaces, they also have the tendency, upon drying and after slight weathering action, to show cracks, roughness, brittleness, peeling and a general breakdown of the film structure. The breakdown of a drying oil film may be due to brittleness caused by oxidation products or to a peculiar gel structure which depends, probably, upon the manner of cooking the resin and drying oil if the drying oil composition is a varnish. If the oil-resin mixture is cooked for too long a period, the gel structure formed may be of a type which will not weather satisfactorily.

According to the present invention, these undesirable qualities, such as skinning, gelling and subsequent oxidation, are eliminated and films of greater durability are obtained by adding into paints, varnishes, oils and the like a small quantity of an aldoxime or ketoxime which are compounds obtained by the action of hydroxylamine on aldehydes and ketones respectively. The aldoximes and ketoximes, generally termed oximes, contain the bivalent oximino group =N.OH attached to carbon e. g.:

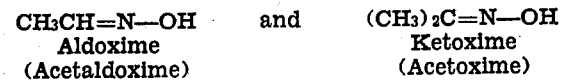

Aldoxime           Ketoxime
(Acetaldoxime)       (Acetoxime)

Nothing has arisen during the experimentation with and the practicing of this invention which would lead one to any other conclusion than that the broad class of compounds containing the bivalent oximino group and represented by aliphatic oximes such as acetaldoxime, acetoxime, butaldoxime, hexaldoxime, heptaldoxime, and decaldoxime; aromatic oximes such as benzaldoxime, naphthyldoxime, acetophenoneoxime, phenyl-p-tolyl ketoxime and salicyldoxime; and cyclic ketoximes such as camphordoxime and cyclohexaldoxime will function as anti-skinning agents.

These compounds may be represented by the following general structure:

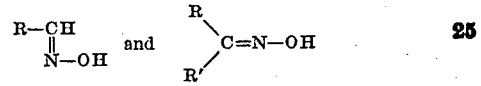

where R and R' may be an aliphatic, aromatic, cyclic or alkylated aromatic radical which may contain a hydroxy or isocyanate grouping. Of the substances enumerated above as illustrative of the present invention, n-heptaldoxime is the preferred species.

In the experiments made in evaluating the skinning properties of these oximes, it was deemed desirable to select, as a standard for comparison, the most effective commercially available anti-skinning agents. Guiacol, which is one of the most efficient of the anti-skinning agents to be found on the market, can be purchased in various grades, all of which appear to be of about the same degree of efficiency. These guiacol products have a rather disagreeable odor and for this reason only small quantities can be used. Also, quantities greater than 1.0% cannot be employed without sacrificing rapid drying when added to quick drying varnishes. Lower percentages, such as 0.1%, only inhibit the skinning for 19 days.

Pyrocatechol is also a very powerful antiskinning agent, as low as 0.1% appeared to prevent skinning to the same degree as ten times the amount of guiacol. However, amounts of pyrocatechol greater than 0.1% interfere with rapid drying. Its odor is rather pronounced and unpleasant and somewhat analogous to guiacol. Its principal drawback is its darkening effect when mixed with varnishes.

As a specific example of an embodiment of this invention, a varnish which had a pronounced tendency to skin was prepared according to the following formula:

Varnish formula

| | | |
|---|---|---|
| Modified phenolic resin | pounds | 100 |
| China-wood oil | gallons | 30 |
| Petroleum thinner | do | 50 |

Dryers equivalent to 0.4% lead; 0.03% manganese and 0.01% cobalt based on the weight of drying oil.

Procedure

The oil and 75 pounds of the resin were heated to 550° F. for 30 minutes. The balance of the resin was added and the varnish cooled to 450° F. and thinned with the mineral spirits. When the thinned varnish reached room temperature, 5.5 lbs. of mixed dryers were added thereto. The material thus obtained was a very rapid drying varnish which contained substantially 51% of non-volatile matter, and when flowed on a clean wooden panel, dried hard to touch in 3½ hours.

To 100 gram portions of the finished varnish prepared in the manner described above, 0.2% of n-heptaldoxime based on the non-volatile content of the varnish was added. Small vials were filled about half-full with these varnish portions, using 2 vials (2 oz. and 4 oz.) for each test. Samples of the untreated varnish were likewise included for comparison. The vials were stoppered and examined for skinning at regular intervals. To those samples, both treated and untreated, which did not skin at the end of 4 days, a fresh supply of air was admitted. A skin was considered to have formed when it had sufficient strength to support the varnish when the vials were inverted. This type of accelerated test is equivalent to several weeks or months for varnishes packed in cans with the usual small air space which is allowed, provided the cans are not opened until the contents are to be used. At the end of 4 days the non-inhibited varnish in both the 2 oz. and 4 oz. bottles formed a skin. After 220 days the inhibited varnish did not form a skin in either the 2 oz. or the 4 oz. bottles.

Inhibited varnish samples which showed no skinning after standing a month were flowed over a clean wooden panel. Samples of the untreated varnish were also flowed over in the same manner on identical panels for purposes of comparison. The dried panels of the treated and non-treated varnish were exposed in a Weather-o-meter for a period of 7 cycles (equivalent to about 11 weeks). The cycle used in this artificial weathering apparatus consists of the following weather conditions every 24 hours, which is taken as a cycle:

| | |
|---|---|
| 1 hour | Rain |
| 2 hours | Light |
| 2 hours | Rain |
| 18 hours | Light |
| 1 hour | Blank |
| 24 hours | Total |

After 76 cycles in the Weather-o-meter the panels coated with the uninhibited varnish showed cracks, roughness, peeling, brittleness and other usual undesirable weathering characteristics, whereas the panels coated with the inhibited varnish did not exhibit any of the undesirable characteristics but showed a marked improvement in the film durability, thus indicating that the inhibitors counteracted the undesirable oxidation effects in the latter stages of the drying process, thereby increasing the varnish film durability and counteracting the wrinkle formation by retarding superficial oxidation.

The anti-skinning agents of this invention may be employed in practically any type of drying oil composition, such as paints, enamels, varnishes, etc. as well as in the drying oils used in their manufacture. When used as oxidation inhibitors in drying oils, the quantity may be from 0.01% to 0.5%. Their action in drying oils is to inhibit the action of gaseous oxygen when confined in containers, interrupt the induction period (superficial peroxide formation) until the normal oxidation rate has progressed to the desirable stage of drying, and retarding subsequent oxidation thus extending the life of the film.

These anti-skinning agents mix readily with oleoresins, varnishes, and also act as gelation inhibitors in tung oil varnish cooking. They mix readily in paints, enamels, etc. They do not increase the viscosity or give any false body. Their added advantages are their light color and mild odor, thus preventing the darkening or coloring of light straw colored varnishes. They do not react between driers such as lead, cobalt and manganese in that they act as neutral bodies in varnishes, enamels and the like. They may likewise be used to retard deterioration of other oxidizable organic material such as printing inks, soaps, cracked gasoline, aldehydes, essential oils, artificial rubber isomers, synthetic rubber and the like.

While the preferred embodiment of this invention has been disclosed, it will be readily apparent to those skilled in the art that many changes and variations may be made therein without departing from the spirit of the invention. The scope of the invention is to be limited solely by the appended claims which are to be construed as broadly as the prior art will permit.

We claim:

1. The method of preserving drying oil compositions which tend to deteriorate by the absorption of oxygen from the air which comprises adding to it an organic compound containing the bivalent oximido group.

2. The method of preserving drying oil compositions which tend to deteriorate by the absorption of oxygen from the air which comprises adding to it an organic compound represented by the formula R R'C=NOH in which R is one of the group consisting of an alkyl, aryl and aralkyl radical and R' is one of the group consisting of hydrogen and alkyl, aryl and aralkyl radicals.

3. The method of preserving drying oil compositions which tend to deteriorate by the absorption of oxygen from the air which comprises adding to it an aliphatic aldoxime.

4. The method of preserving drying oil compositions which tend to deteriorate by the absorption of oxygen from the air which comprises adding to it an aromatic ketoxime.

5. The method of preserving drying oil compositions which tend to deteriorate by the absorption of oxygen from the air which comprises adding to it a cyclic ketoxime.

6. A coating composition containing a drying oil, a positive oxidation catalyst and, as a negative oxidation catalyst, an organic aldoxime in sufficient quantity to substantially prevent oxidation of the composition in the packaged state without materially retarding the normal drying rate of the composition when exposed in a thin film state to the normal atmosphere.

7. A coating composition containing a drying oil, an oil-soluble resin, a dryer and an oxidation inhibitor consisting of n-heptaldoxime.

8. A coating composition consisting of a drying oil, an oil-soluble resin, a dryer and 0.2% of n-heptaldoxime based upon the nonvolatile content of the coating composition.

9. A method for preventing the formation of scum or skin on the surface of a packaged drying oil composition which comprises incorporating in the composition an organic aldoxime.

10. A method for preventing the formation of scum or skin on the surface of a packaged drying oil composition which comprises incorporating in the composition n-heptaldoxime.

11. A drying oil coating composition having incorporated therein from 0.01% to 0.5% of an organic compound containing the bivalent oximino group.

12. A drying-oil coating composition having incorporated therein from 0.01% to 0.5% of n-heptaldoxime.

13. A method of increasing the weather-resistant qualities of drying oil films which consists in adding to the drying oil from 0.01% to 0.5% of an organic compound containing the bivalent oximino group.

14. A method of increasing the weather-resistant qualities of drying oil films which consists in adding to the drying oil from 0.01% to 0.5% of an aliphatic aldoxime.

15. A method of increasing the weather-resistant qualtities of drying oil films which consists in adding to the drying oil from 0.01% to 0.5% of n-heptaldoxime.

HAROLD C. REYNOLDS, Jr.
HENRY B. KELLOG.

DISCLAIMER 2,228,487.—*Harold C. Reynolds, Jr.*, Elizabeth, and *Henry B. Kellog*, Union City, N. J. ANTISKINNING AND WEATHER RESISTING AGENT FOR DRYING OIL COMPOSITIONS. Patent dated January 14, 1941. Disclaimer filed September 25, 1942, by the assignee, *Standard Oil Development Company*.

Hereby enters this disclaimer to claims 1, 2, 3, 6, and 9 in said specification.

[*Official Gazette October 27, 1942.*]